(12) United States Patent
Thaler, III et al.

(10) Patent No.: US 11,962,694 B2
(45) Date of Patent: *Apr. 16, 2024

(54) KEY PAIR GENERATION BASED ON ENVIRONMENTAL FACTORS

(71) Applicant: Microsoft Technology Licensing, LLC, Redmond, WA (US)

(72) Inventors: David Garfield Thaler, III, Redmond, WA (US); Joerg-Thomas Pfenning, Redmond, WA (US); Gerardo Diaz-Cuellar, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,152

(22) Filed: Nov. 29, 2021

(65) Prior Publication Data

US 2022/0085995 A1 Mar. 17, 2022

Related U.S. Application Data

(62) Division of application No. 16/200,779, filed on Nov. 27, 2018, now Pat. No. 11,190,352.

(51) Int. Cl.
| | |
|---|---|
| *H04L 9/08* | (2006.01) |
| *G06F 21/60* | (2013.01) |
| *G06F 21/62* | (2013.01) |
| *H04L 9/30* | (2006.01) |
| *H04L 9/32* | (2006.01) |

(52) U.S. Cl.
CPC .......... *H04L 9/0872* (2013.01); *G06F 21/602* (2013.01); *G06F 21/62* (2013.01); *H04L 9/0866* (2013.01); *H04L 9/30* (2013.01); *H04L 9/3234* (2013.01)

(58) Field of Classification Search
CPC ....... H04L 9/0872; H04L 9/0866; H04L 9/30; H04L 9/3234; G06F 21/602; G06F 21/62
USPC .......................................................... 713/189
See application file for complete search history.

(56) References Cited

U.S. PATENT DOCUMENTS

2018/0041507 A1* 2/2018 Sivarajan ................ G06F 21/44

FOREIGN PATENT DOCUMENTS

| EP | 1189409 A2 * | 3/2002 | ............. G01C 21/32 |
| GB | 2447674 A * | 9/2008 | ............. G06F 7/588 |

OTHER PUBLICATIONS

"Non-Final Office Action Issued in Indian Patent Application No. 202147023172", dated Jan. 23, 2023, 7 Pages.

* cited by examiner

*Primary Examiner* — Bryan F Wright
(74) *Attorney, Agent, or Firm* — Mark K. Young; Mark Young PC

(57) ABSTRACT

A computing device, such as a personal computing device (e.g., laptop, smartphone, etc.) or server, is configured to utilize environmental factors in generating public/private key pairs to access restricted data or operations. The environmental factors can include location, time, barometric pressure, acceleration, temperature, humidity, and the like. An initial key pair may be used to encrypt data and enable other conventional security features. A key pair can be subsequently generated based on the same environmental factors as with the initial key pair generation and used to access the data or operations which have been restricted using the initial key pair.

20 Claims, 13 Drawing Sheets

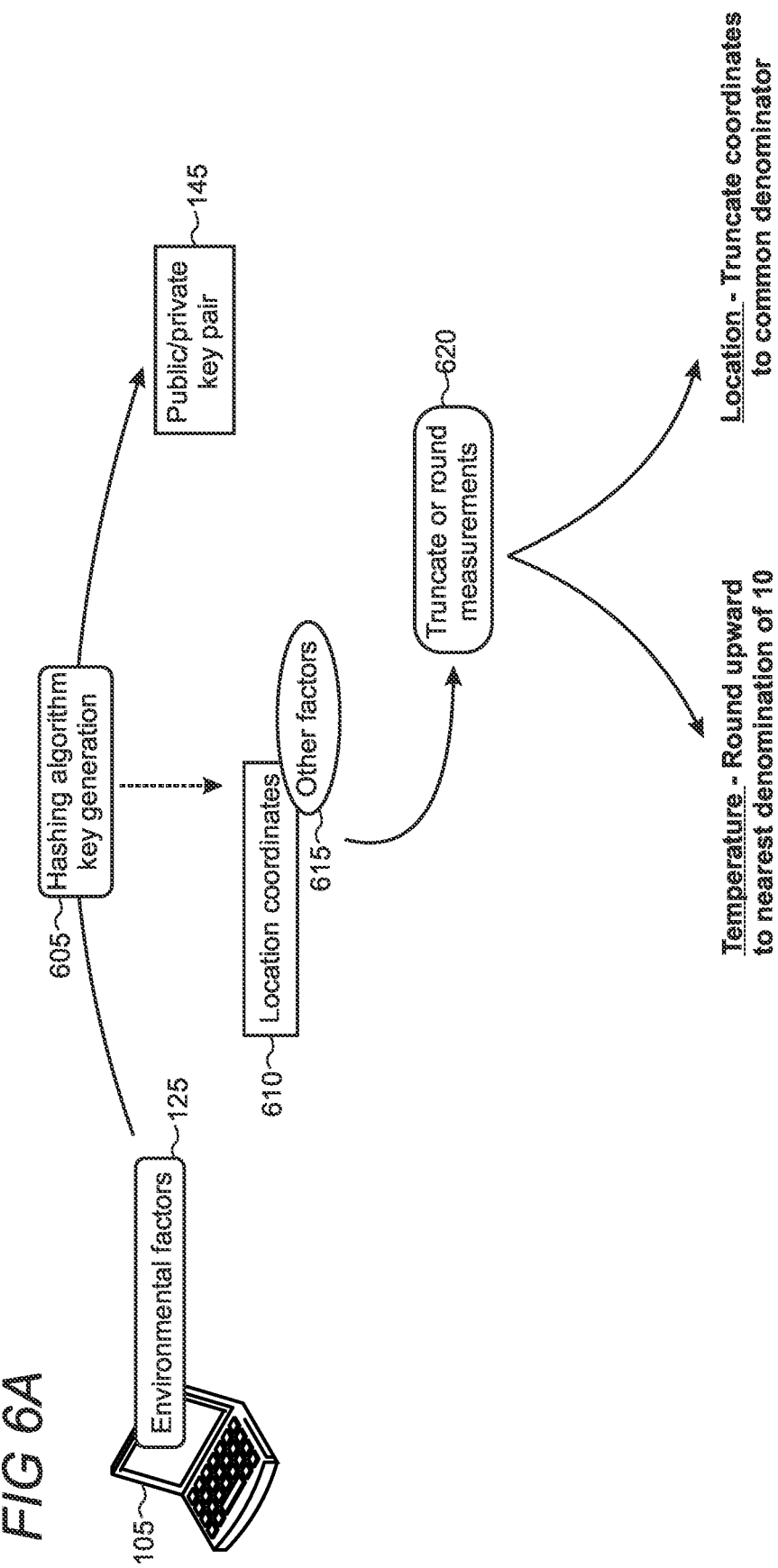

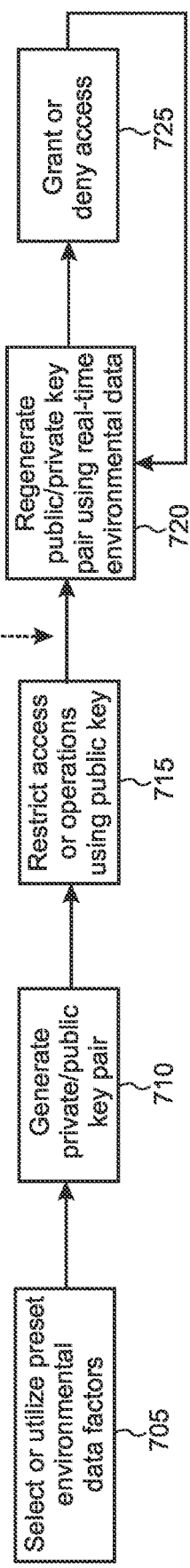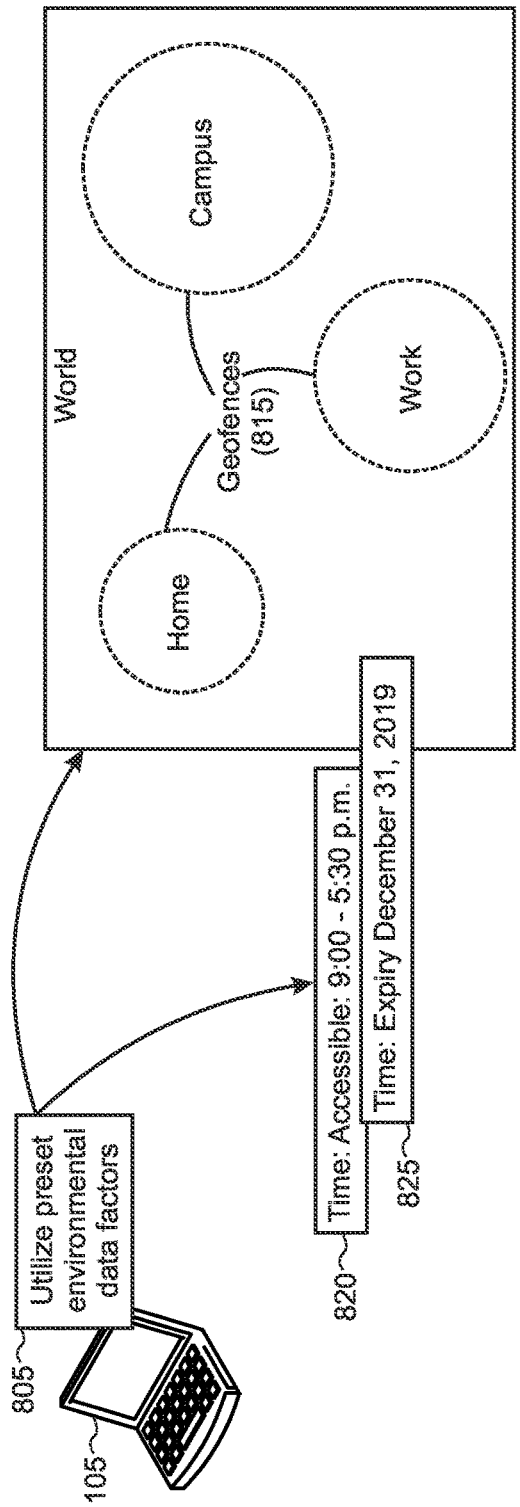

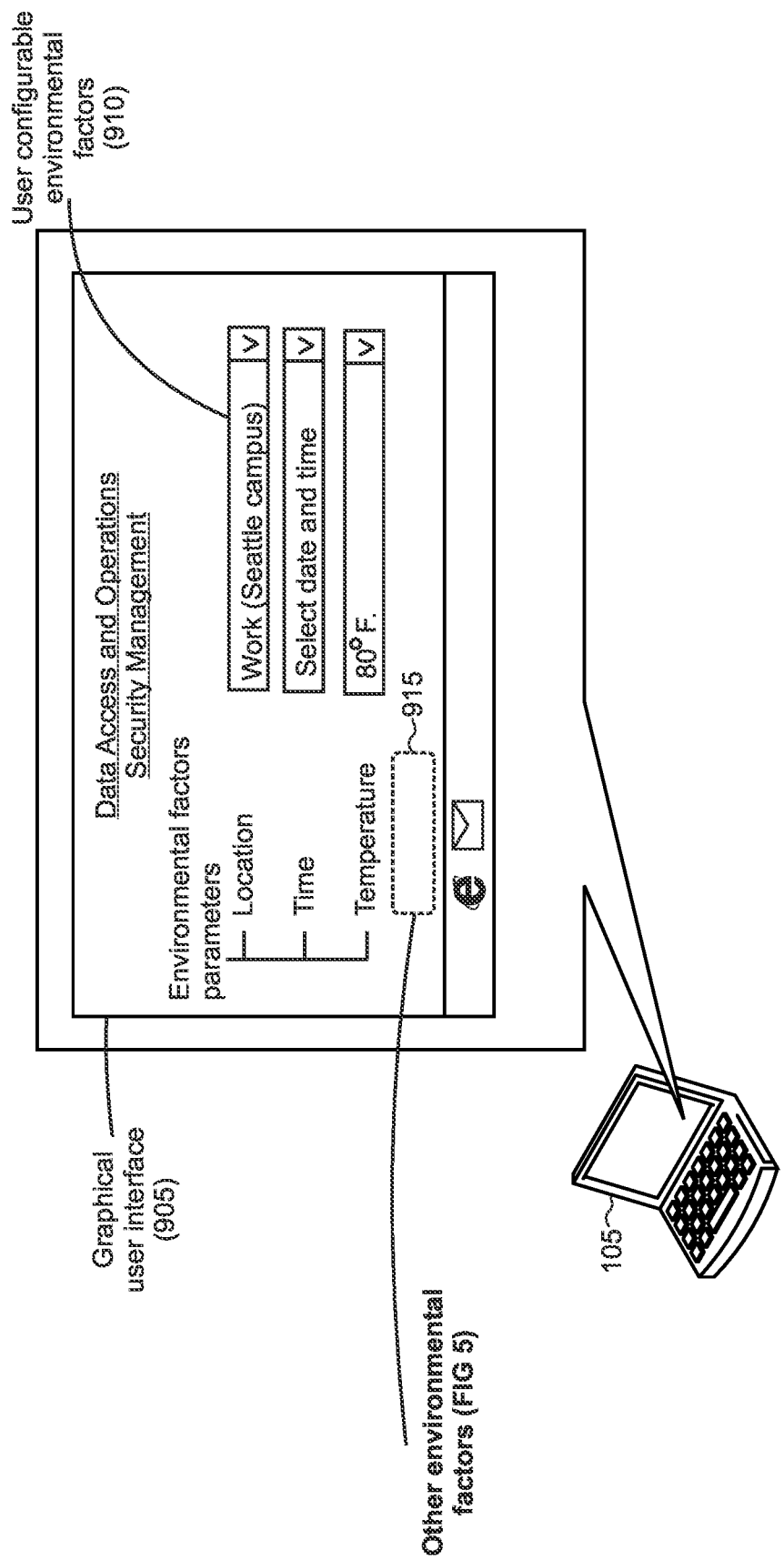

1300

1400

KEY PAIR GENERATION BASED ON ENVIRONMENTAL FACTORS

CROSS REFERENCE TO RELATED APPLICATION

This application is a divisional of U.S. patent application Ser. No. 16/200,779, filed Nov. 27, 2018, entitled, "Key Pair Generation Based on environmental Factors," the contents of which are incorporated by reference in its entirety.

BACKGROUND

Computing devices employ encryption, trusted execution environments, and other security mechanisms to protect private data from being improperly accessed. Developing and utilizing additional forms of protection over data access or device operations can enable personal device users and businesses to maintain system integrity.

SUMMARY

A trusted execution environment is facilitated by public/private key pairs that are generated using one or more trusted environmental factors such as location, time, barometric pressure, acceleration, temperature, humidity, and the like. The trusted environmental factors can also be combined with conventional non-environmental factors such as device-specific factors (e.g., machine ID, state, configuration, etc.) and authentication-factors (e.g., user ID, biometric information, etc.) to generate the key pairs in some use scenarios. The generated key pair may be used to encrypt/decrypt data, authenticate and authorize users, and enable other conventional security features. The key pairs can be subsequently regenerated, as needed, using the same one or more trusted environmental factors as with the original key pair generation, to thereby obviate the need to store one or both keys in the pair and, in some embodiments, to obviate the need to store any of the key pairs on a chain of key generations using specified information.

The on-demand dynamic regeneration of key pairs can add robustness to security protections of data, users, and infrastructure by including additional cryptographic verifications to the key pair generation process. The environmental factors also enhance the integrity of trusted execution by reducing opportunities for key theft and repudiation. The sources for the environmental factors can include trusted remote environmental sensors such as secure GPS (global positioning system) and geomagnetic field sensing, and trusted local sensors such as thermometers, accelerometers, and biometric readers.

Different environmental factors and combinations of factors can be utilized for public/private key pair generation according to a given use scenario. For example, a computing device location can be determined using signals from a secure GPS which are cryptographically verified as trusted. The location information is used to create the key pair to restrict access or operations using an encryption mechanism. For example, data or an authentication token can be encrypted, in which the authentication token can be used to access data or perform a device operation. In this implementation, the key pair may not be stored on the device since it can be regenerated. Alternatively, the environmental factors can be verified by the computing device and the key pair can be stored inside the trusted execution environment, such as a trusted platform module, which is accessible upon verification of the environmental factors.

To subsequently access the encrypted (i.e., "secret") data or perform a restricted operation, the key pair is regenerated using the same location information (and any additionally applicable factors) as with the original key pair generation. The regenerated keys can then be used to decrypt and access the restricted data or operations. This key pair generation/regeneration process effectively places a geofence around the trusted execution environment as the secret data can only be accessed so long as the computing device is within some bounded geographic location that can be cryptographically verified using signals from, for example, a trusted Global Navigation Satellite System (GNSS). The key pair generations/regenerations can themselves be proof that the environmental factors were met in some cases. In the embodiment in which the key pair is stored at the computing device, the computing device passes a claim over to the trusted execution environment that the environmental factors have been verified. The computing device may alternatively make the claim to a remote server that stores the data or performs the operation.

The trusted execution environment can be bounded in other ways using other environmental factors or combination of factors. For example, access to secret data or restricted operations may be denied after expiration of a time interval (where time stamps are cryptographically verified), and an industrial machine may be enabled to operate only within a certain temperature range (using temperature data from a trusted sensor).

The use of environmental factors as a security mechanism enhances protection over accessing private data and performing operations while providing users control over access capabilities. Since environmental factors can be derived from trusted sources over cryptographic means, bad actors can be prevented from spoofing the environmental factors, like location. Control over accessing documents, media, and other data can be individualized and customizable using the environmental factors. For example, certain individuals within a company can be provided access to documents when they are at their respective homes and/or at certain times of day. Furthermore, individuals at one campus can be provided access to certain data or operations and individuals at another campus can be provided access to other data or operations. Leveraging environmental factors in an authentication process to either grant or deny access to data or device operations can thereby increase security and provide enhanced control to a device user or company.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 6A shows an illustrative environment in which a hashing algorithm is used for key pair generation;

FIG. 7 shows a flowchart of an illustrative method which may be performed to permit or deny access to data or services;

FIG. 8 shows an illustrative environment in which a computing device utilizes pre-set environmental factors when generating the public/private key pair;

FIG. 9 shows an illustrative environment in which a graphical user interface enables a user to select environmental factors for the public/private key pair generation;

Like reference numerals indicate like elements in the drawings. Elements are not drawn to scale unless otherwise indicated.

DETAILED DESCRIPTION

Figure 1:
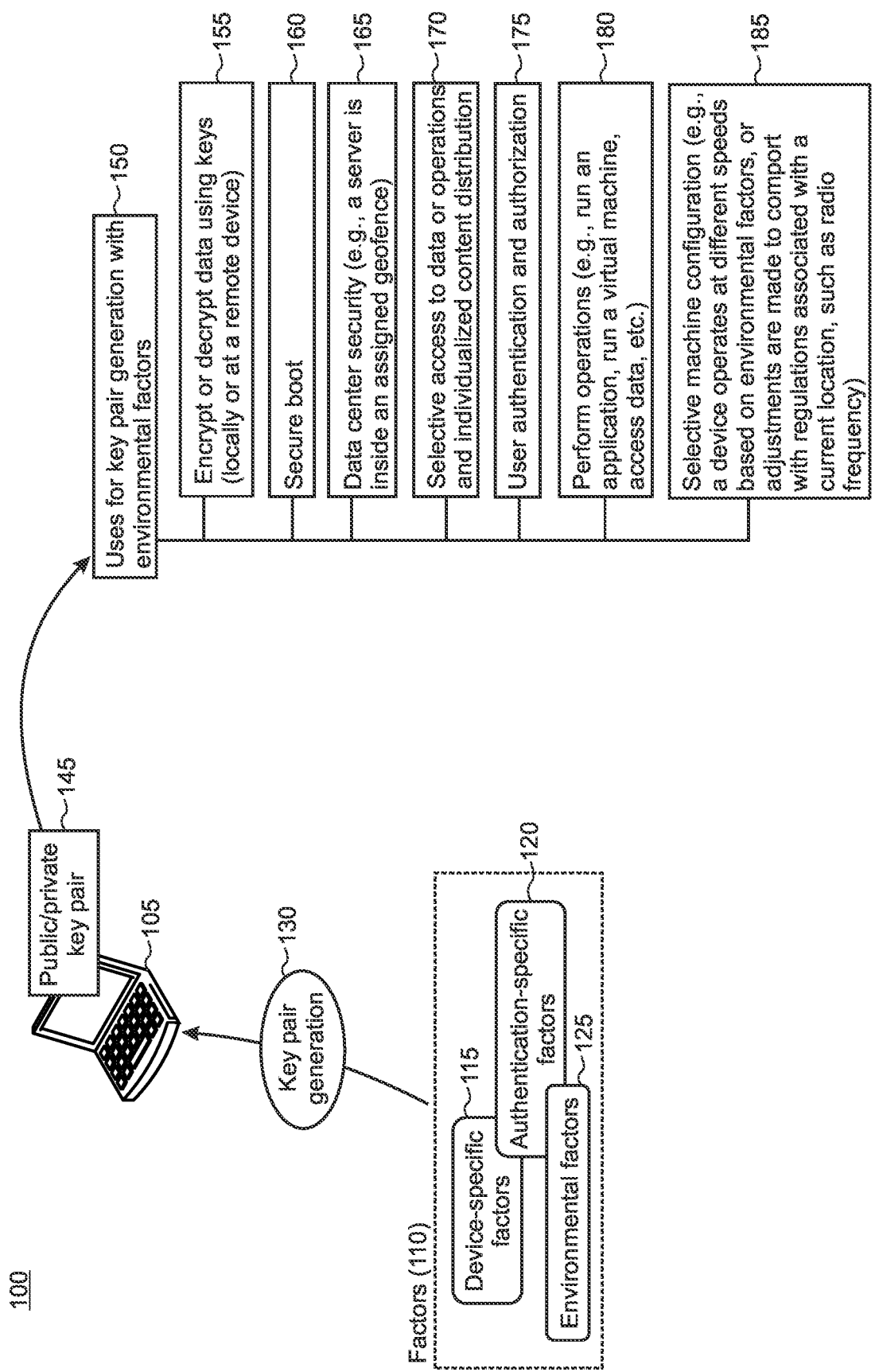
FIG. 1 shows an illustrative diagram in which a public/private key pair is generated using various factors.

FIG. 1 shows an environment 100 in which a computing device 105 generates a public/private key pair 145 using various factors 110, as illustratively shown by numeral 130. There can be various factors that the computing device uses to generate the key pair, including device-specific factors 115, authentication-specific factors 120, and environmental factors 125. The dynamic and on-demand generation of the key pairs can increase security for secret data or restricted operations from unauthorized users. For example, an initially generated key pair based on environmental factors can be used to encrypt data or an authorization token, and a regenerated key pair can be used to decrypt the data or the authorization token. The regenerated key pair can be created based on the same environmental factors as the initial key pair, thereby causing generation of the same key pair for successful decryption. Generating and regenerating the private key pair also enables the computing device not to store the public/private key pair, any intermediate key in the process, or any variant key based on different environmental factors and parameters, thereby preventing a bad actor from potentially obtaining the private key portion.

The generation of the public/private key pair 145 using environmental factors can have a taxonomy of uses, as illustratively shown by numeral 150. For example, the generated key pair can be used to encrypt or decrypt data (locally or at a remote device) 155, in measured or secure boot 160, for data center security (e.g., verify a server is inside an assigned geofence) 165, for selective access to data or operations and individualized content distribution (content, language, advertisements, etc. can be tailored based on, e.g., location) 170, for user authentication and authorization 175, to perform operations (e.g., run an application, run a virtual machine, access data) 180, and for selective machine configuration (e.g., a device operates at different speeds based on environmental factors, or adjustments are made to comport with regulations associated with the current location, such as radio frequencies) 185.

Figure 2:
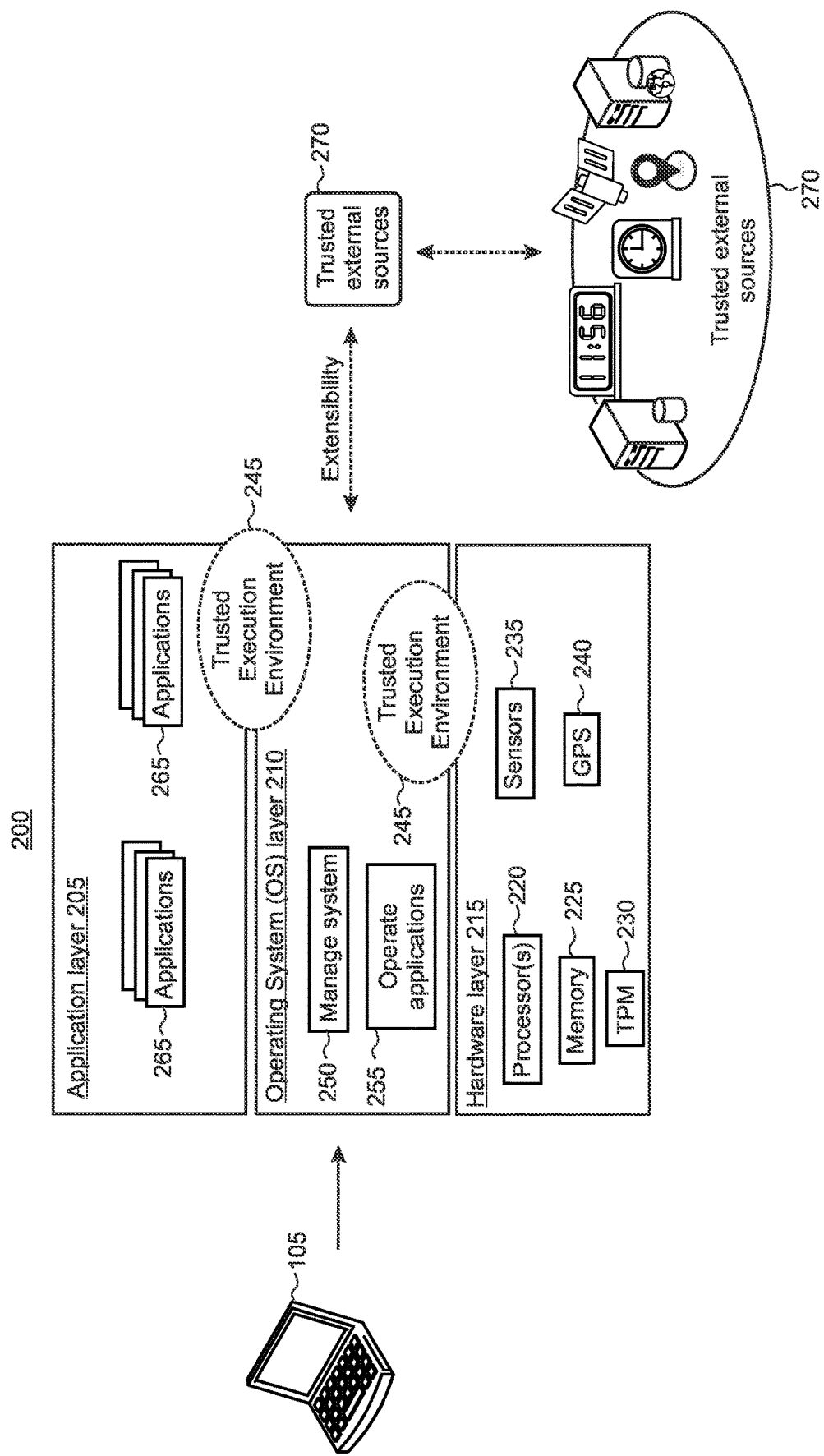
FIG. 2 shows an illustrative architecture of a computing device.

FIG. 2 shows an illustrative and generic architecture 200 of the computing device 105. The architecture is arranged in layers and includes a hardware layer 215, an operating system (OS) layer 210, and an application layer 205. The hardware layer 215 provides an abstraction of the various hardware used by the computing device 105 to the layers above it. In this illustrative example, the hardware layer supports one or more processors 220, memory 225, a trusted platform module (TPM) 230, various sensors 235 for gathering data, and a location component such as a global positioning system (GPS) 240.

The TPM may provide a trusted execution environment 245 within the computing device to enable secure processing and, for example, authentication of the computing device using a unique key pair stored or generated therein. The trusted execution environment can enable secure processing for application and OS layer functions. For example, the various hardware components can be partitioned such that portions of the hardware are dedicated for only public operations, and portions of the hardware are dedicated for only trusted operations. This partitioning of the components and system provide the secure isolation offered by the trusted execution environment.

The GPS 240 may operate regularly or periodically to verify the location of the computing device. Depending on the specific computing device and its application, a diverse set of one or more sensors 235 may be implemented with the computing device, such as temperature sensors, pressure sensors, barometers, proximity sensors, etc. The GPS and sensors may be utilized to derive the data for the environmental factors as discussed for FIG. 1.

The application layer 205, in this illustrative example, supports various applications 265. Any number of applications can be utilized by the computing device 105, whether proprietary or third-party applications. The applications can be implemented using locally executing code. However, in some cases, applications can rely on services and/or remote code execution provided by remote servers or other computing platforms.

The OS layer 210 supports, among other operations, managing the operating system 250 and operating applications 255. The OS layer may interoperate with the application and hardware layers to facilitate execution of programs and perform various functions and features.

The computing device 105 can be configured with extensibility to trusted external sources 270 which may, for example, utilize cryptography to secure transmitted content. The external sources can be used to provide data for various environmental factors used to generate the public/private key pair. As illustratively shown in FIG. 2, trusted environmental sources can include clocks operating on one or more servers and a Global Navigation Satellite System (GNSS). The GNSS may use cryptographic signatures in communications with the computing device which substantiates the computing device's detected location, thereby preventing spoof and other attacks. Timing measurements for communications between the satellite and computing device can also be utilized to verify the correct location is obtained. Additionally, time can be an environmental factor in which a current time can be within some preset time period or range of time. The current time can come from multiple external sources for verification. For example, multiple time sources from distinct first or third-party servers can be collectively used to verify a current time is within some predetermined threshold difference (e.g., within 10 seconds, one minute, etc.). The GNSS can serve dual purposes in transmitting trusted location data and time data to the computing device. Furthermore, the computing device can be configured with a secure portion of the central processing unit (CPU), such as using Software Guard eXtensions (SGX) from Intel®, which can be utilized for the trusted location information.

Figure 5:
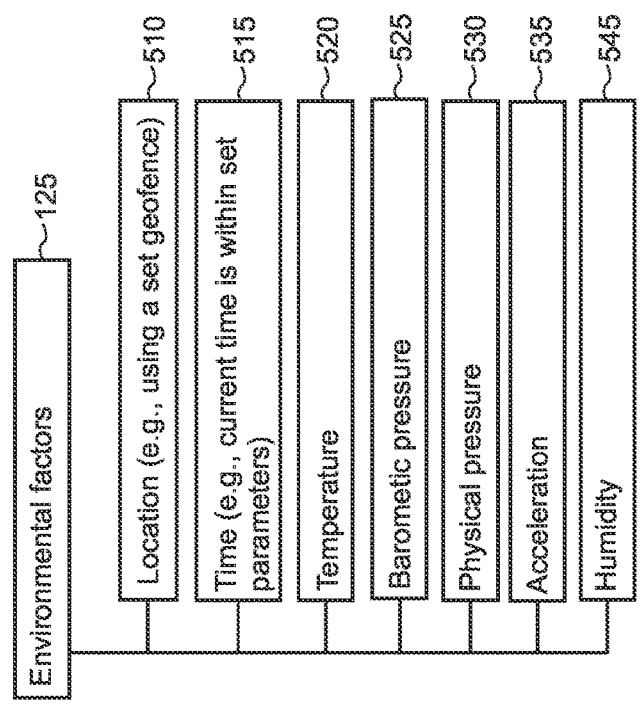
FIG. 5 shows an illustrative taxonomy of environmental factors which may be used to generate the public/private key pair.
Figure 3:
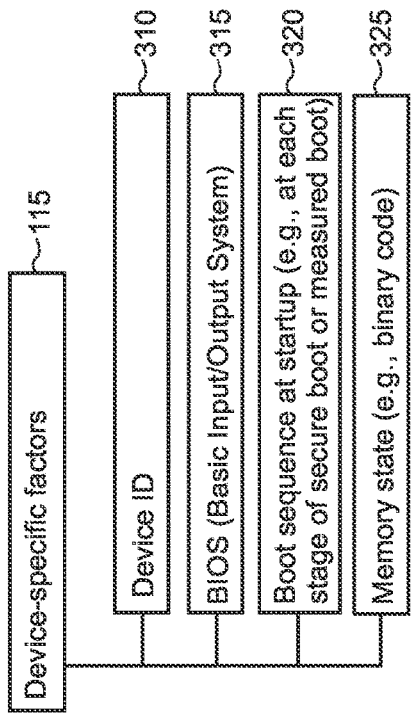
FIG. 3 shows an illustrative taxonomy of device-specific factors which may be used to generate the public/private key pair.
Figure 4:
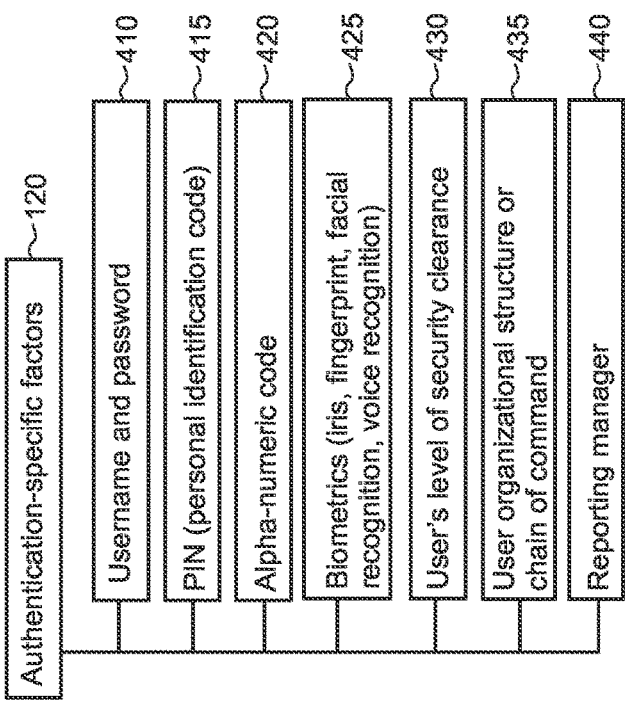
FIG. 4 shows an illustrative taxonomy of authentication-specific factors which may be used to generate the public/private key pair.

FIGS. 3-5 show various non-exhaustive factors which may be used individually or in various combinations to generate the public/private key pair. FIG. 3 shows an illustrative taxonomy of device-specific factors 115, which can include device identification (ID) information 310, BIOS (Basic Input/Output System) 315, boot sequence at startup 320, and memory state (e.g., binary code) 325. One or more of these factors can be utilized in generating and regenerating the public/private key pair.

FIG. 4 shows an illustrative taxonomy of authentication-specific factors 120 which may be used in generating the public/private key pair. The authentication-specific factors can be functions that authenticate a user of the computing device. Authentication-specific factors can include username and password 410, personal identification number (PIN) 415, alpha-numeric code 420, biometrics (e.g., iris, fingerprint, facial recognition, voice recognition) 425, a user's level of security clearance 430, user organizational structure or chain of command 435, and reporting manager 440.

FIG. 5 shows an illustrative taxonomy of environmental factors 125 which may be used to generate the public/private key pair. One or more environmental factors can be utilized to authenticate the computing device and may or may not be combined with one or more device-specific or authentication-specific factors 115, 120. Environmental factors can include location (e.g., using a predetermined geofence) 510, time (e.g., current time is within a predetermined parameter) 515, temperature 520, barometric pressure 525, physical pressure 530, acceleration 535, and humidity 545. While specific data values for the environmental factors may be utilized, ranges for each environmental factor may also be used to accommodate discrepancies within some acceptable and threshold difference. The environmental factors can be utilized alone or in various combinations to meet the needs of a particular implementation or use scenario. For example, the acceleration environmental factor can be considered to restrict operations when a computing device is moving in a vehicle. Temperature and location environmental factors may be used in combination to provide selective data access to a computing device only when it is located indoors. The location environmental factor can be considered to make data unreadable or be considered to provide access to a different set of data in some implementations.

FIG. 6A shows an illustrative environment in which the environmental factors 125 are utilized in a hashing algorithm to generate the public/private key pair 145, as illustratively shown by numeral 605. Exemplary environmental factors which are utilized in the hashing algorithm include location coordinates 610 and other factors 615. The hashing algorithm may utilize data for the environmental factors to generate the public/private key pair. Measurements for the data can be truncated or rounded as illustratively shown by numeral 620. For example, temperature can be rounded upward to a nearest denomination of 10 (e.g., 30°, 40°, etc.), and latitude/longitude coordinates can be rounded to some common denominator. In other implementations, numbers can be rounded downward to the nearest denomination. Using a rounding or truncation scheme can reconcile small measurement differences for the environmental factors. For example, if the initial public/private key pair is generated with a latitude of 40.6798, then this number can be truncated to 40.67. A subsequent latitude location of 40.6755 can be truncated to 40.67. Using various rounding or truncation mechanisms enables consistent key pair generation when the user is inside an acceptable geofence, such that each location inside a geofence can utilize the same location value when generating the public/private key pair.

In other embodiments, typical geofencing or tiling techniques can be utilized with the hashing algorithm to generate the public/private key pair 145. For example, in some embodiments a geofence may be associated with an organizational specific location. Using geofences for these organizational or otherwise known areas can be utilized for the key pair generation process.

Figure 6B:
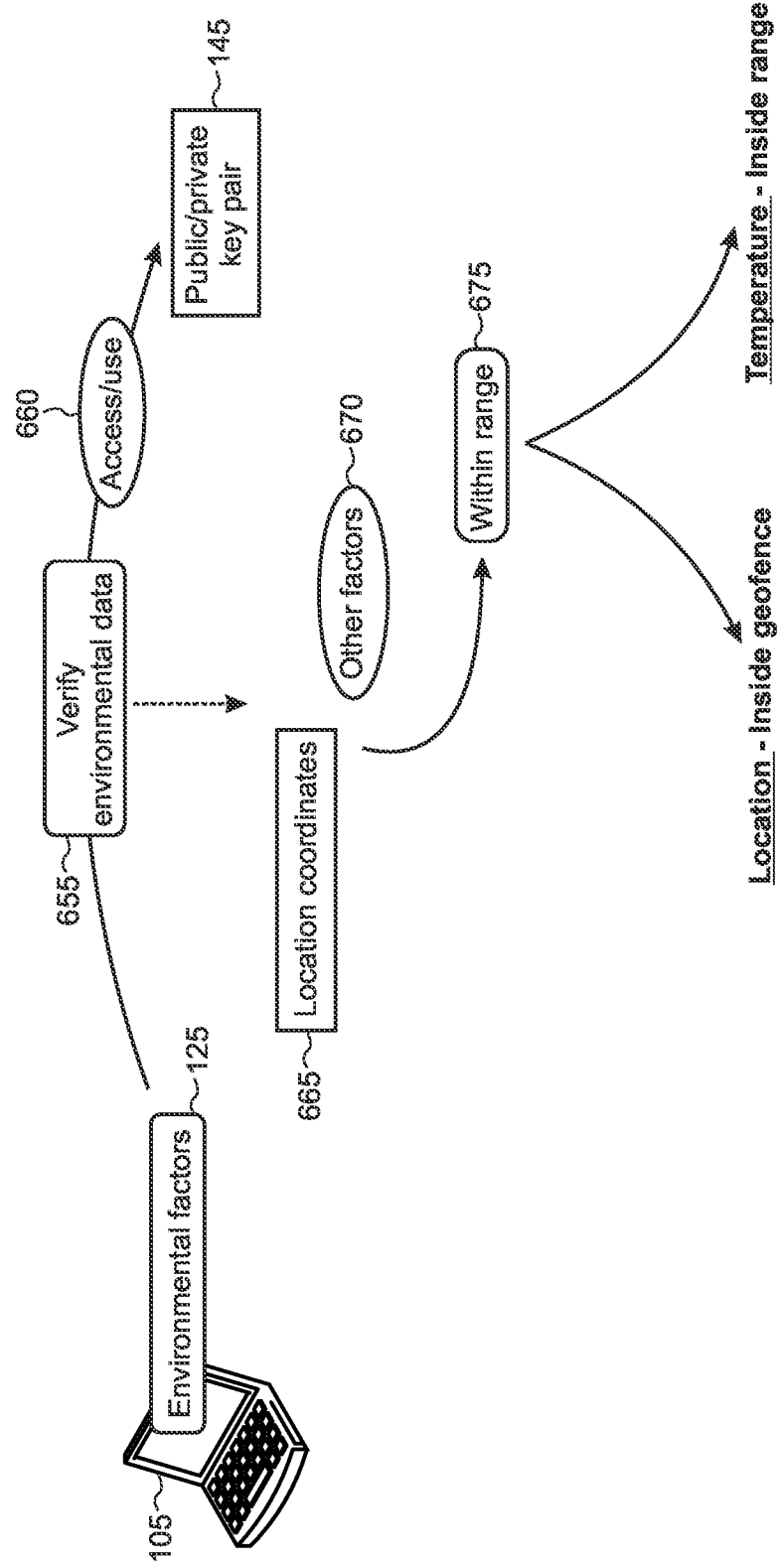
FIG. 6B shows an illustrative environment in which environmental factors are verified before providing access to use a stored private key.

FIG. 6B shows an illustrative environment in which an alternative mechanism for authenticating the computing device 105 is utilized. In this implementation, the data for the environmental factors are verified and the stored public/private keys are utilized during an authentication process, as illustratively shown by numerals 655 and 660. The location coordinates 665 and other factors 670 are verified to be within a preset range 675. For example, the location coordinates may be verified as being inside a geofence and a sensed temperature may be verified as being inside a range. Upon verification of the environmental factors being within the preset parameters, the computing device may make a claim to the trusted execution environment or a remote server to use the stored public/private key pair 145. In this scenario, the public/private key pair is not generated, but rather stored, and access to the key pair is conditional on satisfaction of the preset parameters associated with the environmental factors.

FIG. 7 shows an illustrative flowchart of a method used to permit or deny access to secret data or restricted operations. In step 705, environmental factors are utilized for generation of a public/private key pair. The environmental factors can be selected by the user or may be preset. For example, FIG. 8 shows an illustrative environment in which location and time are preset, as illustratively shown by numeral 805. In this example, geofences 815 are established around various destinations, including home, work, and a campus. In alternative implementations, the geofences may be preset based on a user's current location upon generating a public/private key pair. A time of day and expiration date and time are also preset, as illustrated by numerals 820 and 825. In other implementations, one or more environmental factors may be preset for the user, but the user is enabled to select the parameters (e.g., boundaries, range, etc.) for the given environmental factor, such as setting a geofence or a range of time.

FIG. 9 shows an illustrative environment in which a graphical user interface 905 is provided on the user's computing device 105 for the user to set the various environmental factors. The user can either set the parameters for preset environmental factors, or the user may be given control over which environmental factors to employ. In this example, parameters for location, time, and temperature are exposed to the user for customization. While drop down menus 910 are depicted, other input mechanisms are also available such as text boxes, voice input using a microphone, etc. The user can add additional environmental factors as listed in FIG. 5, as illustratively represented by numeral 915.

Referring back to the flowchart depicted in FIG. 7, in step 710, the computing device generates the public/private key pair using the preset or selected environmental factors. For example, location coordinates or time (e.g., an expiry date and time or a time period) can be used in a hashing algorithm to generate the public/private key pair. The location coordinates may use a denomination that spans over a geofence so that each location inside that geofence can generate a same public/private key pair. A set expiration date and time may be used as an environmental factor, in which a current date and time is verified to be prior to the set expiry date and time before it is used in the key generation process. If a set time period is utilized as an environmental factor, then a value for the time (e.g., earliest or latest time for the set time period) can be used in the key generation process upon verifying the current time is inside the time period. Other truncation and rounding methodologies can be used for each utilized environmental factor (e.g., rounding upward or downward to a denomination).

In step 715, the generated public key may be used to restrict access or operations. For example, data or an authentication token may be encrypted using the public key, which can be decrypted using the generated private key. Restricting access to data may be used to protect private or confidential information, such as medical records, proprietary secrets, etc. Restricting operations using the generated key pair can restrict utilization of a virtual machine operating on a remote server or executing an application.

In step 720, in response to a triggering event, the computing device regenerates the public/private key pair using real-time environmental factors (i.e., those factors that are currently applicable to the computing device at the time of regeneration). Exemplary triggering events can include a user request, device bootup, an attempt to perform at least one restricted operational function (e.g., accessing data, running an application, or running a virtual machine), expiration of a time period, after execution of one or more operations, or upon a threshold change in one or more of the environmental factors (e.g., when the computing device enters or leaves a geofence, when temperature increases or decreases beyond a threshold degree, etc.). The data for the environmental factors can be obtained from the trusted sources (e.g., external servers, GNSS, etc.) or locally executing sensors like thermometers, pressure sensors, and the like.

Using the regenerated public/private key pair, access is either granted or denied to the computing device in step 725. One or multiple keys (e.g., two, three, four, etc.) can be generated and used depending on the implementation, such as the number of times keys are generated, the number of environmental factors utilized, and the way in which the factors are included in the given implementation. The one or more regenerated private keys can be utilized to decrypt an authorization token or data which was encrypted using the public key that was previously, or initially, generated (step 710). Steps 720 and 725 may be performed in each instance in which the computing device attempts to access data or an operation provided by the device or remote server.

Figure 10:
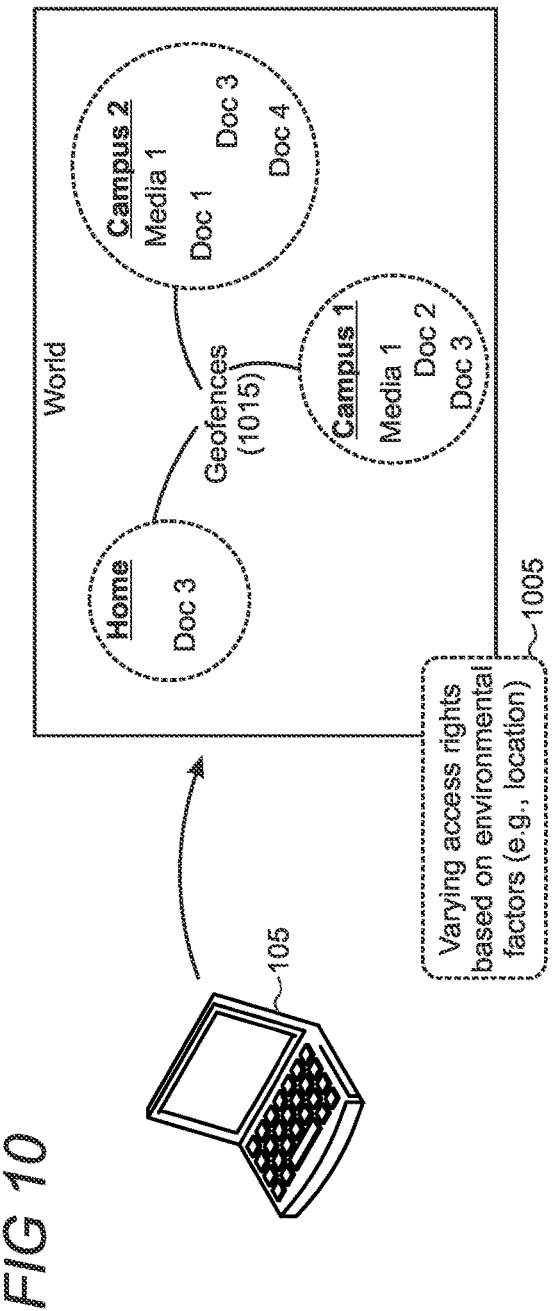
FIG. 10 shows an illustrative environment in which the user is provided varying access capabilities based on the environmental factors.

FIG. 10 shows an illustrative environment in which the user is provided varying access rights based on the environmental factors and current environmental conditions, as illustratively represented by numeral 1005. The computing device and its user may be provided certain access rights based on, for example, his location at home, Campus 1, or Campus 2. For example, Doc 3 is accessible at each location, Doc 4 is accessible at Campus 2, and Doc 2 is accessible at Campus 1. Media 1 (e.g., a video, recording, etc.) is accessible at both campuses, but not at home. In another exemplary implementation, control over device operations can be regulated, such as prohibiting control over a power plant unless the computing device is inside a geofence for that power plant. In another exemplary implementation, a geofence is applied to a hard disk in a datacenter so that the data cannot be read when the hard disk is located outside of that data center beyond the geofence.

Figure 11:
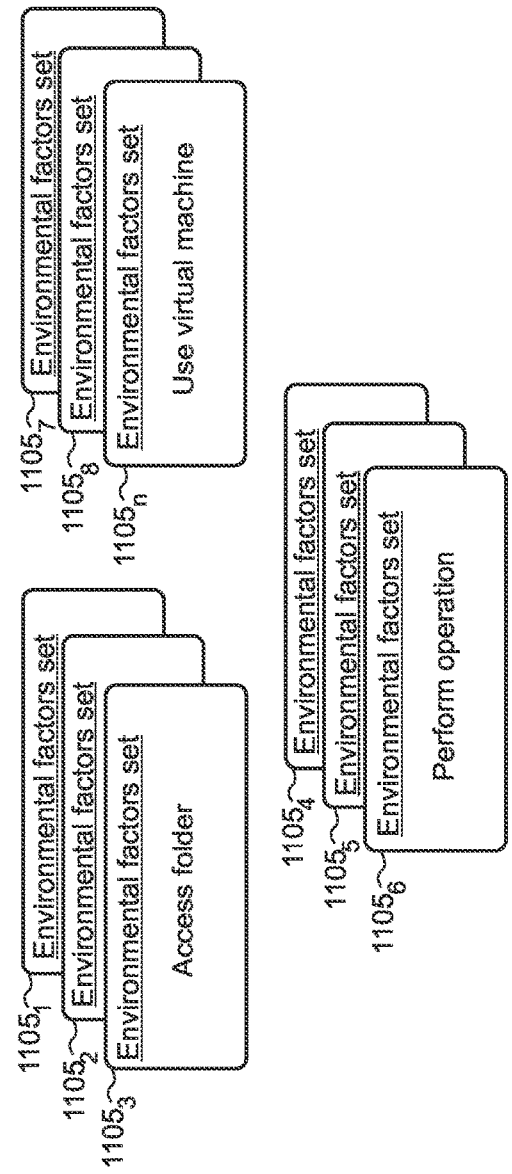
FIG. 11 shows an illustrative diagram of sets of environmental factors.

FIG. 11 shows an illustrative diagram in which a set 1105 of environmental factors can be used to access a given folder, use a virtual machine, or perform an operation. There may be multiple sets of environmental factors, each set having specific parameters which, when satisfied, enable access to data or performance of an operation.

While certain access and operational performance features are shown in FIGS. 10 and 11, one or more sets of environmental factors may be used for any of the uses shown in FIG. 1. For example, the user may be able to access certain content based on his verified location so that language, advertising material, and the like are appropriately tailored to the user. Certain documents can be regulated using time as the environmental factor, such that certain documents are viewable based on the time of day, period of time, or an expiration date by which the documents can be viewed. For example, one document may be accessible between 9:00 a.m. and 12:00 p.m., whereas another document may be accessible from 1:00 p.m. to 3:00 p.m.

Figure 12:
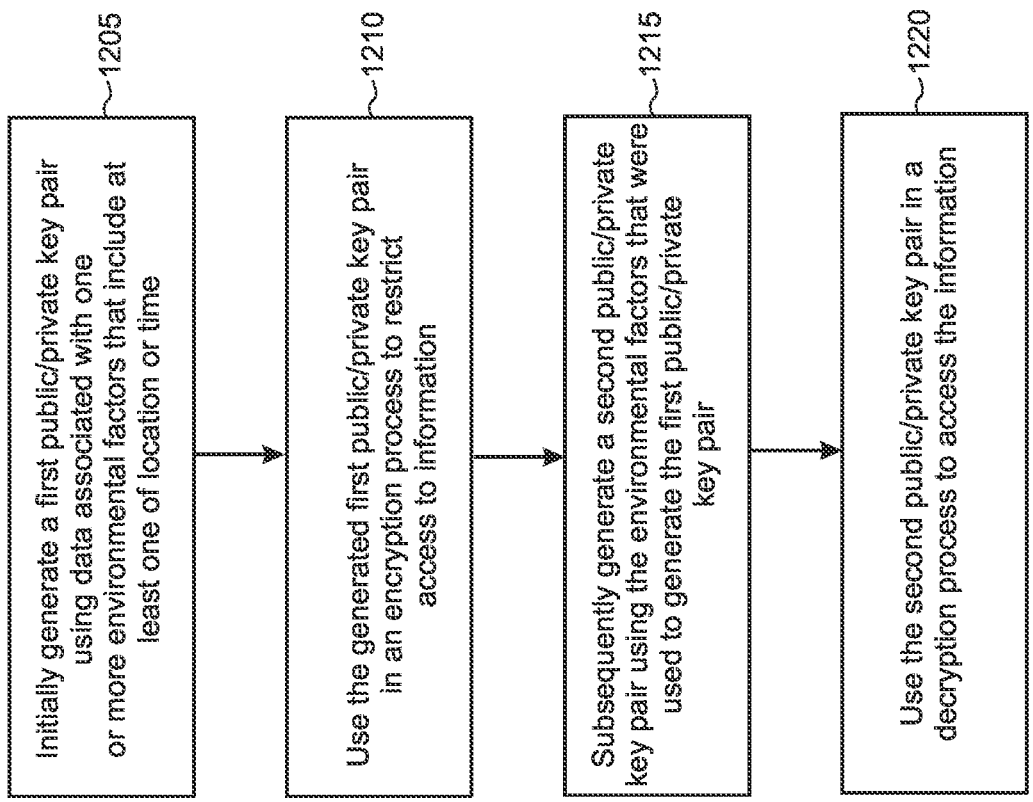
FIGS. 12-14 show flowcharts of illustrative methods executed by a given computing device, server, etc.
Figure 13:
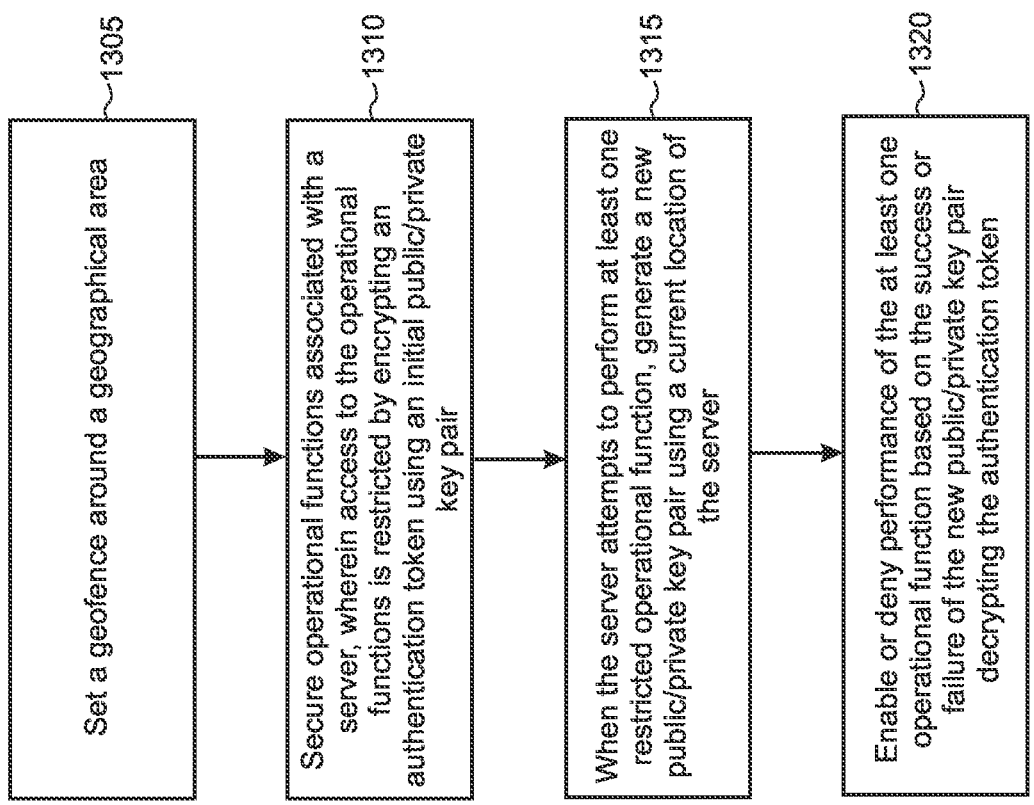
Figure 14:
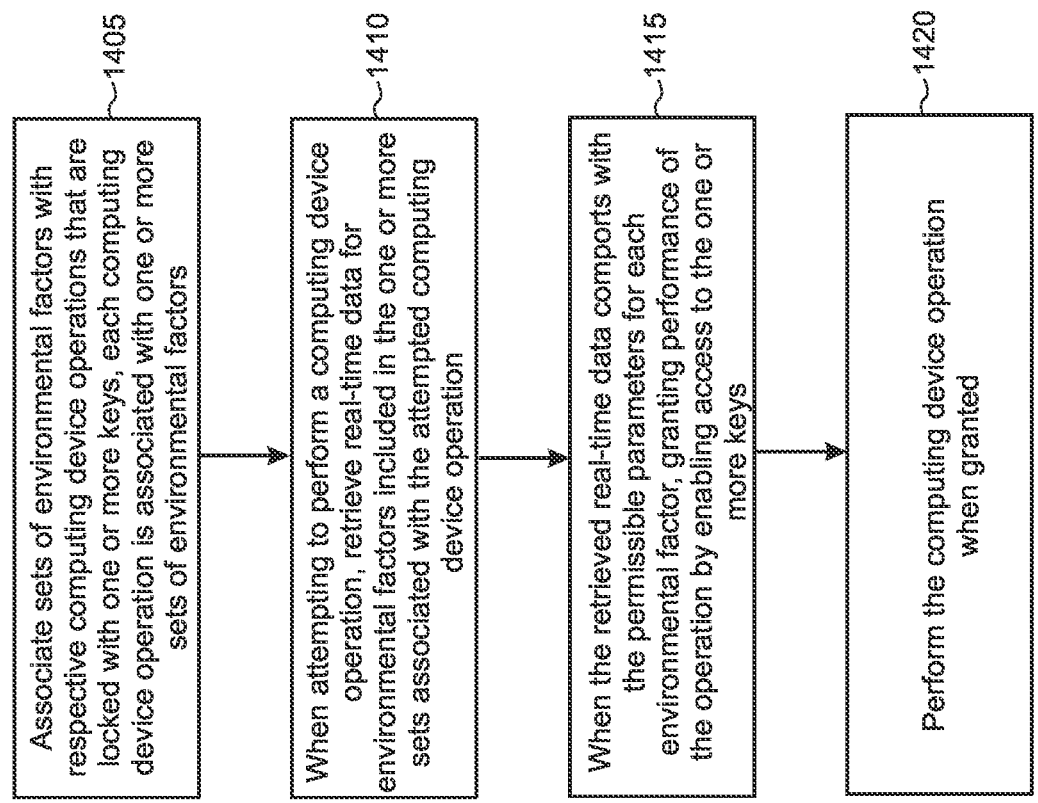

FIGS. 12-14 show flowcharts of illustrative methods which may be implemented by a computing device. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 12 is a flowchart of an illustrative method 1200 which is performed by the computing device. In step 1205, the computing device initially generates a first public/private key pair using data associated with one or more environmental factors that include at least one of location or time. In step 1210, the computing device uses the generated first public/private key pair in an encryption process to restrict access to information. In step 1215, the computing device subsequently generates a second public/private key pair using the environmental factors that were used to generate the first public/private key pair. In step 1220, the computing device uses the second public/private key pair in a decryption process to access the information.

FIG. 13 is a flowchart of an illustrative method 1300 which is performed by a computing device, such as a server. In step 1305, a geofence is set around a geographical area. In step 1310, the server restricts access to operational functions by an encrypting an authentication token using an initial public/private key pair. In step 1315, when the server attempts to perform at least one operational function, the server generates a new public/private key pair using a current location of the server. In step 1320, the server is either enabled to perform the operational function or denied performance of the operational function depending on whether the new public/private key pair successfully or unsuccessfully decrypts the encrypted authentication token.

FIG. 14 is a flowchart of an illustrative method 1400 which is performed by a computing device. In step 1405, the computing device associates sets of environmental factors with computing device operations that are locked with one or more keys. Each device operation may be associated with one or more sets of environmental factors. In step 1410, the computing device retrieves real-time data for environmental factors when attempting to perform a computing device operation. In step 1415, performance of the operation is granted when the retrieved real-time data comports with the permissible parameters by enabling access to the one or more keys to unlock the computing device operation. In step 1420, the computing device performs the operation when granted.

Figure 15:
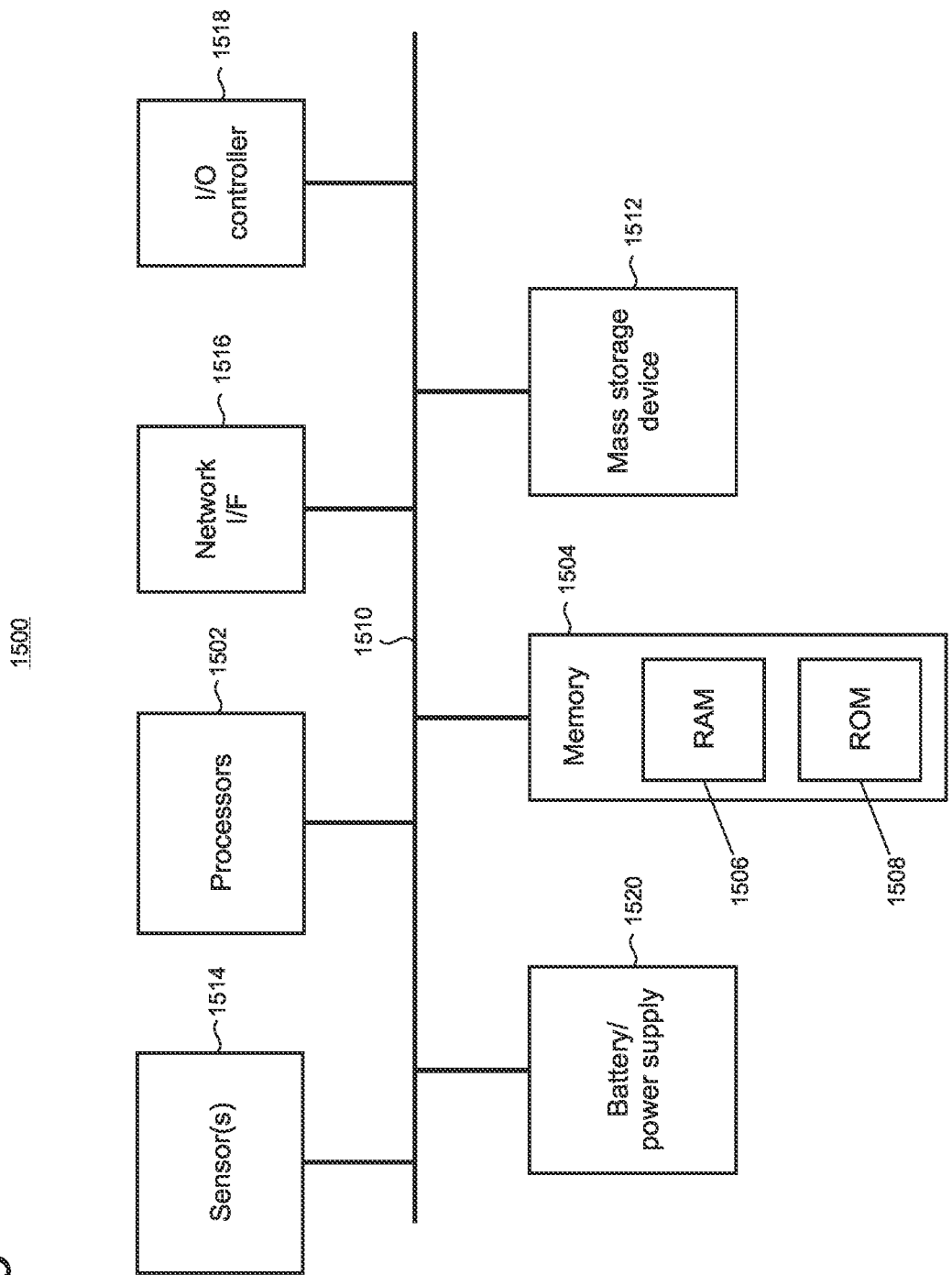
FIG. 15 is a simplified block diagram of an illustrative computing system or IoT device that may be used in part to implement the present trusted execution based on environmental factors.

FIG. 15 shows an illustrative architecture 1500 for a computing device such as a laptop computer or personal computer for the present trusted execution based on environmental factors. The architecture 1500 illustrated in FIG. 15 includes one or more processors 1502 (e.g., central processing unit, dedicated Artificial Intelligence chip, graphics processing unit, etc.), a system memory 1504, including RAM (random access memory) 1506 and ROM (read only memory) 1508, and a system bus 1510 that operatively and functionally couples the components in the architecture 1500. A basic input/output system containing the basic routines that help to transfer information between elements within the architecture 1500, such as during startup, is typically stored in the ROM 1508. The architecture 1500 further includes a mass storage device 1512 for storing software code or other computer-executed code that is utilized to implement applications, the file system, and the operating system. The mass storage device 1512 is connected to the processor 1502 through a mass storage controller (not shown) connected to the bus 1510. The mass storage device 1512 and its associated computer-readable storage media provide non-volatile storage for the architecture 1500. Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that the software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1500 may further include one or more sensors 1514 or a battery or power supply 1520. The sensors may be coupled to the architecture to pick up data about an environment or a component, including temperature, pressure, etc. Exemplary sensors can include thermometers, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Figure 16:
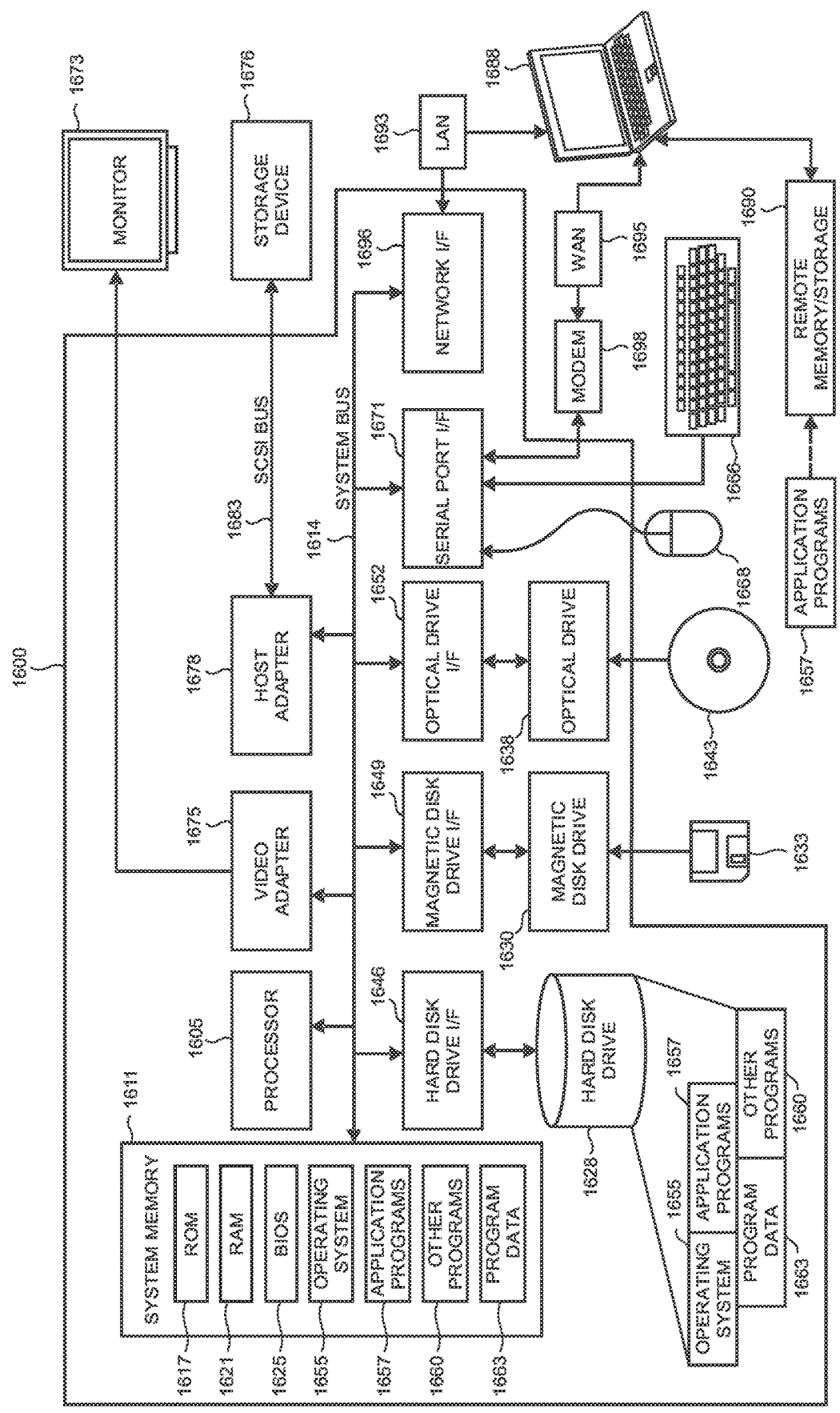
FIG. 16 is a simplified block diagram of an illustrative computer system that may be used in part to implement the present trusted execution based on environmental factors.

FIG. 16 is a simplified block diagram of an illustrative computer system 1600 such as a PC, client machine, or server with which the present trusted execution based on environmental factors may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present trusted execution based on environmental factors. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present trusted execution based on environmental factors.

Various exemplary embodiments of the present application of machine learning for building predictive models enabling smart failover between different network media types are now presented by way of illustration and not as an exhaustive list of all embodiments. An example includes a method performed by a computing device to dynamically generate public/private key pairs for enhancing computing device security, comprising: initially generating a first public/private key pair using data associated with one or more environmental factors, wherein the environmental factors at least include one of location or time; using the generated first public/private key pair in an encryption process to restrict access to information; when attempting to access the information, retrieving current data associated with the one or more environmental factors that were used to generate the first public/private key pair, the retrieving being performed contemporaneously with the attempting in real-time; subsequently generating a second public/private key pair using the retrieved current data; and; and using at least the second public/private key pair in a decryption process to access the information.

In another example, the location is based on a geofence, and each location inside the geofence uses the same location data for public/private key generation. As another example, the method further includes setting the geofence, and wherein the geofence is set in response to input from a user or is set according to some preset parameter based on the initial generation of the first public/private key pair. In another example, the computing device generates a public/private key pair on demand, at bootup of the computing device, or upon a threshold change for at least one of the environmental factors. In another example, the on-demand generation is in response to a request from a user to access the information. In another example, at least some data for the environmental factors are received from one or more trusted sources that are external to the computing device. In another example, the environmental factors further include one or more of temperature, barometric pressure, acceleration, humidity, or physical pressure. As another example, the generation of the first and second public/private key pairs is additionally based on computing device-specific factors including a configuration of the computing device. In another example, the configuration of the computing device includes any one or more of a device ID, memory state, BIOS (Basic Input/Output System), or boot sequence at startup. As another example, the generation of the first and second public/private key pairs is additionally based on authentication factors that are used to authenticate a user of the computing device, in which the authentication factors include any one or more of username and password, PIN (personal identification number), alpha-numeric code, security clearance level, organizational structure or chain of command, or biometric verification including recognition of one of fingerprint, iris, face, or voice.

A further example includes a server, comprising: one or more processors; and one or more hardware-based memory devices storing computer-readable instructions which, when executed by the one or more processors, cause the server to: set a geofence around a geographical area; secure operational functions associated with the server, wherein access to the operational functions is restricted by encrypting an authentication token using an initial public/private key pair that is generated using location data associated with the set geofence; when one or more triggering events occur, generate a new public/private key pair using a current location of the server; enable performance of at least one operational function when the new public/private key pair successfully decrypts the encrypted authentication token; and deny performance of the at least one operational function when the new public/private key pair unsuccessfully decrypts the encrypted authentication token.

In another example, the operational function includes accessing data, running an application, or running a virtual machine. As another example, the one or more events which trigger generation of the new public/private key pair include the server attempting to perform at least one restricted operational function, expiration of a time period, or upon execution of one or more operations. In another example, the new public/private key pair: successfully decrypts the authentication token when the current location of the server is inside the geofence; and unsuccessfully decrypts the authentication token when the current location of the server is outside of the geofence. As another example, the current location is received from a Global Navigation Satellite System (GNSS).

A further example includes one or more hardware-based non-transitory computer-readable memory devices storing instructions which, when executed by one or more processors disposed in a computing device, cause the computing device to: associate sets of environmental factors with respective computing device operations that are locked with one or more keys, each computing device operation being associated with one or more sets of environmental factors, each environmental factor being associated with a permissible parameter, and wherein the permissible parameters for the environmental factors associated with each set are used as a basis to grant or deny performance of the respective computing device operation; when attempting to perform a computing device operation, retrieve real-time data for environmental factors included in the one or more sets that are associated with the attempted computing device operation; when the retrieved real-time data comports with permissible parameters for each environmental factor, granting performance by enabling access to the one or more keys to unlock the computing device operation; and perform the computing device operation when granted.

In another example, changes in real-time data for the environmental factors enable different access rights to the device operations. In another example, the enabled access to the one or more keys includes accessing a public/private key pair stored within a trusted execution environment of the computing device or enables generating a new public/private key pair. As another example, a permissible parameter for an environmental factor includes a time period or an expiry date and time by which to perform the operation. In another example, a permissible parameter for an environmental factor includes a predetermined geofence, and the retrieved real-time data is location data from a Global Navigation Satellite System (GNSS) which utilizes cryptography in transmitting messages to the computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hardware-based non-transitory computer-readable memory device storing instructions, which, when executed by a processor in a computing device, cause the computing device to:
   lock an operation of the computing device using a key, the key being initially generated based on an environmental factor of a set of environmental factors, the environmental factor associated with a permissible parameter that is used as a basis to grant or deny performance of the computing device operation;
   retrieve real-time data for the environmental factor associated with the locked computing device operation;
   determine that the real-time data comports with the permissible parameter;
   grant performance by enabling the computing device to subsequently regenerate the key using the real-time data to unlock the computing device operation; and
   perform the computing device operation.

2. The hardware-based non-transitory computer-readable memory device of claim 1, wherein changes in the real-time data for the environmental factor change access rights to the computing device operation.

3. The hardware-based non-transitory computer-readable memory device of claim 1, in which access to the key includes accessing a public/private key pair stored within a trusted execution environment of the computing device or generating a new public/private key pair.

4. The hardware-based non-transitory computer-readable memory device of claim 2, in which the permissible parameter for the environmental factor includes a time period or an expiry date and time by which to perform the computing device operation.

5. The hardware-based non-transitory computer-readable memory device of claim 1, in which the permissible parameter for the environmental factor includes a predetermined geofence, and the real-time data is location data from a Global Navigation Satellite System (GNSS) which utilizes cryptography in transmitting messages to the computing device.

6. A method performed by a computing device for performing a restricted computing device operation, comprising:
    obtaining a set of environmental factors which defines parameters for permissions that are associated with the restricted computing device operation;
    associating an authorization token with the restricted computing device operation, the authorization token encrypted with an encryption key that is initially generated based on the parameters;
    waiting until an occurrence of a triggering event, the triggering event including attempting performance of a restricted computing device operation;
    obtaining real-time data for parameters in a set of environmental factors;
    generating a decryption key based on the real-time data subsequently to the occurrence of the triggering event;
    decrypting an authorization token associated with the restricted computing device operation using the decryption key; and
    performing the restricted computing device operation in response to the decrypting.

7. The method of claim 6 in which the encryption key is a public key in a public/private key pair and the decryption key is a private key in the public/private key pair.

8. The method of claim 6 in which the restricted computing device operation comprises one or more of accessing data, running an application, or running a virtual machine.

9. The method of claim 6 in which the real-time data is obtained from a trusted source.

10. The method of claim 6 in which the parameters include a location defined by a geofence or time within a preset range.

11. The method of claim 6 in which the encryption and decryption keys are further generated based on a computing device-specific factor.

12. The method of claim 6 in which the encryption and decryption keys are further generated based on an authentication-specific factor.

13. The method of claim 6 in which the parameters are pre-set or are user-configurable.

14. The method of claim 13 in which the parameters are user-configurable and are exposed for selection by a user in a user interface that is supported on the computing device.

15. A computing device, comprising:
    a processor; and
    a hardware-based non-transitory memory device storing computer-readable instructions which, when executed by the processor, cause the computing device to:
    establish a plurality of geofences around a respective plurality of different locations in which operations on the computing device are performable;
    set permissions for computing device operations in each of the geofenced locations by encrypting an authorization token using an initial public/private key pair that is generated based on location data associated with each geofence;
    responsive to occurrence of a triggering event, generate a new public/private key pair using a current location of the computing device; and
    deny performance of a computing device operation at the current location responsively to unsuccessful decryption of the authorization token by the new public/private key pair.

16. The computing device of claim 15 in which the triggering event for generation of the new public/private key pair comprises one of a user request, the computing device attempting to perform a restricted operational function, expiration of a time period, or execution of operations by the computing device.

17. The computing device of claim 15 in which the executed instructions further cause the computing device to generate the initial public/private key pair based on an environmental factor that is applicable to a geofenced location.

18. The computing device of claim 17 in which the executed instructions further cause the computing device to generate the new public/private key pair based on an environmental factor that is applicable to the current location.

19. The computing device of claim 17 in which the triggering event for generation of the new public/private key pair comprises a change in an environmental factor that exceeds a predetermined threshold.

20. The computing device of claim 17 in which the environmental factor includes one of temperature, barometric pressure, acceleration, humidity, or physical pressure.

* * * * *